United States Patent
Akiyama et al.

[11] Patent Number: 5,610,853
[45] Date of Patent: Mar. 11, 1997

[54] FERROELECTRIC MATERIAL, AND SEMICONDUCTOR MEMORY, OPTICAL RECORDING MEDIUM AND MICRO-DISPLACEMENT CONTROL DEVICE USING THE FERROELECTRIC MATERIAL

[75] Inventors: Yoshikazu Akiyama, Yokohama; Sachiko Kimura, Tokyo, both of Japan

[73] Assignee: Ricoh Company, Ltd., Tokyo, Japan

[21] Appl. No.: 660,341

[22] Filed: Jun. 4, 1996

Related U.S. Application Data

[62] Division of Ser. No. 168,770, Dec. 16, 1993, Pat. No. 5,555,219.

[30] Foreign Application Priority Data

| Dec. 16, 1992 | [JP] | Japan | 4-354494 |
| Mar. 16, 1993 | [JP] | Japan | 5-081365 |
| Mar. 26, 1993 | [JP] | Japan | 5-092346 |
| Sep. 6, 1993 | [JP] | Japan | 5-245949 |

[51] Int. Cl.$^6$ .................................................. H01L 27/10
[52] U.S. Cl. ........................................ 365/145; 365/117
[58] Field of Search ............................ 365/145, 117; 359/103

[56] References Cited

U.S. PATENT DOCUMENTS

| 3,973,247 | 8/1976 | Kumada et al. | |
| 3,990,057 | 11/1976 | Kumada | 340/173.2 |
| 5,202,054 | 4/1993 | Suzuki et al. | |
| 5,374,375 | 12/1994 | Yui et al. | |
| 5,418,389 | 5/1995 | Watanabe | 257/295 |
| 5,541,422 | 7/1996 | Wolf et al. | 257/9 |
| 5,555,219 | 9/1996 | Akiyama et al. | 365/145 |

FOREIGN PATENT DOCUMENTS

| 62-216282 | 9/1987 | Japan |
| 63-173475 | 7/1988 | Japan |
| 63-161544 | 7/1988 | Japan |
| 6-334140 | 12/1994 | Japan |

*Primary Examiner*—Viet Q. Nguyen
*Attorney, Agent, or Firm*—Cooper & Dunham LLP

[57] ABSTRACT

A ferroelectric material has hysteresis characteristics in the polarization-electric field relationship thereof, exhibits an antiferroelectric phase at room temperature, and carries out a structural phase transition from the antiferroelectric state to a ferroelectric phase with the application of an electric field thereto, and a phase transition electric field with which the antiferroelectric-to-ferroelectric phase transition is carried out is shifted to a lower electric field with the elevation of the temperature thereof, and a phase transition electric field with which a ferroelectric-to-antiferroelectric phase transition is carried out has a negative value. A semiconductor non-volatile memory, a rewritable optical recording medium, a highly integrated micro-displacement control device, and a shape memory device, each utilizing the above-mentioned ferroelectric material, are provided.

16 Claims, 8 Drawing Sheets

FERROELECTRIC MATERIAL, AND SEMICONDUCTOR MEMORY, OPTICAL RECORDING MEDIUM AND MICRO-DISPLACEMENT CONTROL DEVICE USING THE FERROELECTRIC MATERIAL

This is a division of application Ser. No. 168,770, filed Dec. 16, 1993, now U.S. Pat. No. 5,555,219.

FIELD OF THE INVENTION

The present invention relates to a ferroelectric-to-antiferroelectric phase transition material, a semiconductor non-volatile random access memory using the ferroelectric-antiferroelectric phase transition material (hereinafter referred to FRAM), a rewritable optical recording medium, a micro-displacement control device, and a shape memory device, using the ferroelectric-to-antiferroelectric phase transition material.

DISCUSSION OF BACKGROUND (1) In the field of metal oxide semiconductors (MOS memory), RAM (random access memory) is used when data has to be rewritten at high speed, and ROM (read only memory) is used when memory of data is more important than rewriting data. In SRAM and DRAM, part of a device in which data is stored is in conjunction with a Si substrate, and therefore the charges stored as the data leak, so that SRAM and DRAM require some mechanism for compensating for the leakage of the data. In the case of SRAM, the recovery of leaked data is carried out by supplying charges from a DC power source, while in the case of DRAM, leaked data is recovered by an intermittent refresh operation. In contrast, in ROM, in particular, in mask ROM in which data is written by a wafer process, writing is carried out only once, but there is no limitation on the memory of data. Memories which are collectively called "non-volatile memory" are memories in which writing can be carried out by the user and no power source is required for retaining data.

The following various types of non-volatile memories have been developed in accordance with the limitation on the number of times for rewriting, and the rewriting mode: 1. OTPAQM, 2. EPROM, 3. FLASH, 4. EEPROM, 5. NVRAM, and 6. FRAM.

The following Table 1 shows the difference in the performance level between an ideal memory and currently employed memories:

TABLE 1

|  | Ideal Memory | Current Memories Ferroelectric Material | Others |
| --- | --- | --- | --- |
| Number of Times for Rewriting | >$10^{15}$ times | ~$10^{11}$ times | <$10^6$ times |
| Rewriting Speed | <100 nsec | ~100 nsec | >1 μsec |
| Memory Time Period | >10 years | >10 years | >10 years |
| Capacitance | >64 M | 16 K | 4 M |

From the above-mentioned point of view, FRAM using a ferroelectric material is considered closest to the ideal memory, although FRAM is limited with respect to the capacitance, and the number of time for rewriting. Furthermore, it is well expected that the problem with respect to the capacitance of FRAM can be solved in the not long distant future by the simplification of the design rule and the further development of the process technologies therefor. For these reasons, FRAM is currently studied with utmost efforts as the only memory with the expectation that FRAM will make an ideal memory in the future.

FRAM has been reported, for instance, in the following references:

1: F. Gandiner: Ramtron's Technical Report (Uni-RAM).
2: S. S. Eaton et al: Tech. Dig. of ISSCC (1988) P. 130 (Shadow SRAM).
3: R. Moazzami et al: IEEE Electron Device Lett., vol. 11, No. 10 (1990) P. 454 (FNVARAM).

The problem to be solved with respect to FRAM which uses a ferroelectric film is the number of times of rewriting. Although this cannot always be said decisively, it is said if FRAM is improved to the extent that the rewritable number of times thereof exceeds $10^{13}$, FRAM will acquire a firm footing for its use in practice by incorporating it in a current system.

The deterioration of the characteristics of a ferroelectric memory during repeated rewriting operations, that is, the fatigue of FRAM, is caused, for instance, by the fatigue thereof by repeated polarization reversal, the diffusion of the materials for the electrodes into the ferroelectric film, the dispersion of oxygen atoms within the lattice of the ferroelectric thin film, and the generation of space charges by the dispersion of oxygen atoms.

(2) The technologies or recording information by use of light, such as photograph and movies, have been indispensable technologies for our daily life. Studies of high density optical disks have begun around 1972. Recording systems using optical recording media and laser as the light source thereof have attracted attention as being recording systems with an unconventionally large capacity such as 500M bytes to several G bytes per medium and therefore are currently studied actively all over the countries. Such optical recording media have various features. Representative features thereof are as follows:

1. Capable of recording information with high density and an extremely large capacity. Having a recording density of $10^8$ bit/cm² or more for recording and reproducing information by a laser beam with the diameter thereof being narrowed down to 1 μm, and having the possibility of increasing the recording density to 1,000 times by shortening the wavelength of the laser beam, and by the multiplication of the recording wavelength.

2. Being resistant to dust even with a particle size of a micron order, since recording and reproduction can be carried out with an optical head sufficiently being out of contact with the recording medium, and accordingly there being no risk of the head crash. Exchanging and hand carrying the recording medium being simple and easy.

Currently employed optical recording media can be roughly classified into (a) a read only type, (b) a write-once type, and (c) a rewritable type. In view of the developed processes of these optical recording media, the rewritable type is considered to be one of optical recording media for the next generation and is being studied as such a memory medium.

As the optical recording media for the next generation, for instance, magneto-optical recording media, phase-changeable recording media, and organic-material-based optical recording media have been reported.

Of these recording media, magneto-optical recording media have been most developed in view of the use in practice. However, in view of the practical use thereof in the future, it is required that the magneto-optical recording media be improved with respect to the quality of signals so that they can handle wide-band analog signals such as signals for use in video disks. To be more specific, it is required that the magneto-optical recording media be improved so as to be able to obtain a sufficiently large Kerr rotation angle ($\theta k$) in a short wavelength region.

The development of materials for the magneto-optical recording media appears to reach the ceiling since amorphous magnetic materials are mainly used for the magneto-optical recording media, and no better materials have been discovered for them. Furthermore, with respect to the operational reliability thereof, the amorphous magnetic materials extremely lack resistance to the environmental conditions and need various protective coatings for use in practice. Magneto-optical disks currently commercialized utilize a magnetic film, but have the shortcoming that overwriting cannot be carried out as in magnetic disks.

Under the above-mentioned circumstances, phase-changeable type optical recording media are currently in the process of development. The phase-change type optical recording media whose structure is reversibly changed by the application of a laser beam thereto have in principle the following advantages over conventional magneto-optical recording media:

(i) No external magnetic field is necessary for recording the erasing information.

(ii) Large production signals can be obtained because the recorded state in the recording media can be directly detected in the form of the quantity of light reflected.

In the phase-change type optical recording media, the phase is changed from an amorphous phase to a crystalline phase and vice versa, and chalcogen compounds are mainly used as materials capable of performing such phase changes.

The characteristics requires for the material used in the phase-change type optical recording media are as follows:

(a) Having high crystallization speed (not more than 100 nsec).

(b) Maintaining an amorphous state at room temperature in a stable manner for an extended period of time (more than 10 years).

(c) Having a large erasure ratio (not less than 30 dB).

(d) Having a high repeated recording and erasure durability (not less than $10^6$ times).

However, a material which meets the above requirements has not yet been developed and a long period of time will be required before a material which satisfies the above requirements is developed.

Furthermore, a repeated recording and erasure durability of at least $10^9$ is required for backing up a large scale computer. There is a view that such a durability cannot be achieved by phase-changeable materials.

On the other hand, organic recording media attracted attention as optical memory media when they were first developed. Those organic recording media are of a "read only" type and of a "write-once type" and appear to be already old-fashioned.

Recently it has been reported that photochromic and photochemical whole burning (PHB), using dye materials, will provide a rewritable medium. However, the studies on such materials have just begun, although they appear promising.

Furthermore, the use of a PLZT electro-optical thin film which is a ferroelectric material as a recording layer for an optical recording medium has been proposed in C. E. Land "Proceeding of the Symposium on Thick and thin Films" Am. Ceram. Soc., Indianapolis, 1989. 4, P. 343–359. However a specific device using a PLZT thin film has not yet been reported, perhaps because of some difficulties in the production technique for producing a PLZT thin film and some limitations encountered on the materials employed therein.

(3) An antiferroelectric-to-ferroelectric phase transition is induced in a zirconium oxide-tin oxide-lead based ceramics by heat, stress or electric field applied thereto. Of the phase transitions induced by heat, stress and electric field, the distortion induced by electric field produces a larger displacement than the displacements caused by an inverse piezoelectric effect or an electrostrictive effect of a piezoelectric material and characteristically has a digital nature.

Furthermore, the electric-field-induced displacement is isotropic, so that an anisotropic stress concentration can be avoided. Therefore materials capable of performing the antiferroelectric-to-ferro-electric phase transition are expected to be less destructed than piezoelectric materials.

It has been proposed to apply materials capable of performing the antiferroelectric-to-ferroelectric phase transition to a micro-displacement control device and to a shape memory device by utilizing the changes in the volume caused by the distortion and the shape memory characteristics.

In order to realize an intelligent device by highly integrating these devices, a technique for producing a thick film of a material capable of performing antiferroelectric-to-ferroelectric phase transition, and a fine working technique for the film are required. However, nothing has been reported about these techniques.

Ceramics have conventionally been produced by mixing metal oxides which constitute ceramics in the form of a slurry and by sintering the slurry at high temperatures.

A large ceramic film can be produced by this method and the raw materials for use in this method are inexpensive. However, it is extremely difficult to closely control the formulation of the compositions for producing a ceramic film by this method, because the compositions have to be sintered at high temperatures in order to produce a film with high density and the desired high performance. Furthermore, the ceramics produced by this method are generally in the shape of a block or a sheet, and it is difficult to produce a thin ceramic film by this method.

Thin films of ceramics are generally produced by various methods such as vacuum deposition, laser abrasion, sputtering, ion-plating, CVD, MO-CVD, and sol-gel process. Of these methods, MO-CVD, laser abrasion, and sol-gel process are considered suitable for producing multi-component composite oxides because the composition thereof can be controlled relatively precisely.

Laser abrasion can provide crystalline films at a relatively low substrate temperature, but cannot currently provide large ceramic film.

MO-CVD has the advantages over other methods that coating performance is excellent with any shapes, the film formation speed is high, and the control of film thickness is easy, but has some limitation on the availability of materials suitable for use in this method.

In the case of sol-gel process, the film formation can be carried out in the open atmosphere and a large ceramic film can be easily produced, but the coating performance is not so good as that of MO-CVD. A remarkable point about this method is that this process can easily cope with the increase of the constituent elements of ferroelectric materials.

The inventors of the present invention have investigated a method of producing a thick ceramic film by utilizing a sol-gel process, taking into consideration the fact that this process can easily increase the components for a ceramic film to be made.

Sol-gel process is conventionally widely used for producing $SiO_2$ glass films and plates with various thicknesses. However, with respect to crystalline metal oxide films, the thickness of a crack-free film obtained by one film formation process is at most about 500 Å, so that this film formation process has to be repeated many times in order to obtain a thick film of a crystalline metal oxide film. Therefore, it is in fact difficult to produce a thick film of a crystalline metal oxide film by a sol-gel process and a method of producing such a thick film by utilizing a sol-gel process has not yet been reported.

SUMMARY OF THE INVENTION

It is therefore a first object of the present invention to provide a ferroelectric material which has hysteresis characteristics in the polarization-electric field relationship thereof, exhibits an antiferroelectric phase at room temperature, and carries out a structural phase transition from the antiferroelectric phase to a ferroelectric phase with the application of an electric field thereto, with a phase transition electric field with which the antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

The above ferroelectric material may exhibit a mixed state of antiferroelectric phase and a ferroelectric state at room temperature.

The above ferroelectric material may comprise a lead-based composite oxide which comprises at least one component selected from the group consisting of zirconium oxide lead, hafnium oxide lead, and tin oxide lead.

The above ferroelectric material may be produced by a sol-gel process or pyrolysis of a metal organic compound.

A second object of the present invention is to provide a semiconductor non-volatile memory utilizing the above-mentioned ferroelectric material, which is not caused to deteriorate by repeated rewriting.

A third object of the present invention is to provide a rewritable optical recording medium utilizing the above-mentioned ferroelectric material, which does not need an external magnetic field, has excellent reproduction characteristics and durability against repeated recording and reproduction, and is capable of overwriting by a simple layered structure.

A fourth object of the present invention is to provide a highly integrated micro-displacement control device and a shape memory device, utilizing the above-mentioned ferroelectric material.

A fifth object of the present invention is to provide a method of recording information and/or erasing recorded information by use of the above-mentioned optical recording medium of the present invention, comprising the steps of (1) applying a laser beam to a recording layer of the optical recording medium with a predetermined bias electric field being applied thereto to perform the structural phase transition in a portion of the recording layer to which the laser beam is applied, thereby recording information therein in the form of recording bits, and/or (2) erasing the recording bits with the application of a laser beam with a predetermined intensity under a zero bias electric field to perform a structural phase transition from the ferroelectric phase to the antiferroelectric phase.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
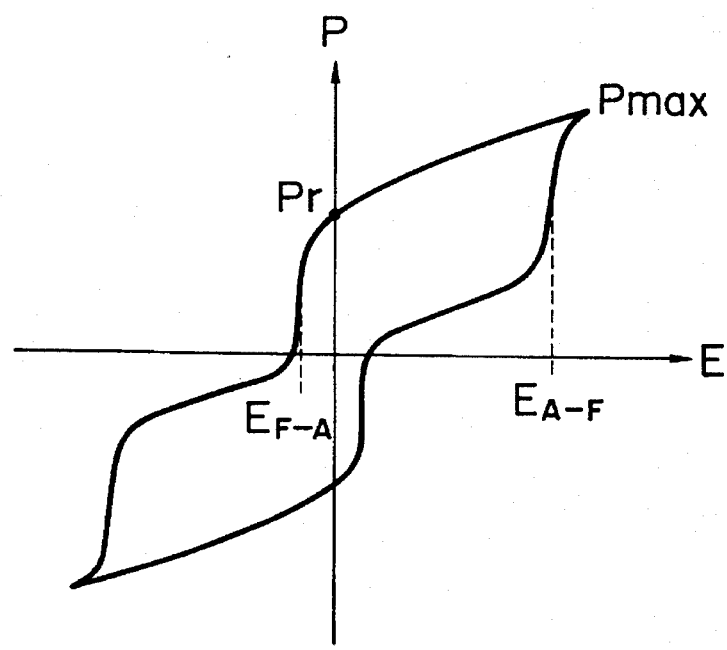
FIG. 1 shows a hysteresis loop with respect to a polarization-electric field relationship of a ferroelectric material of the present invention.

The ferroelectric material according to the present invention is required to have a hysteresis loop with respect to a polarization-electric field relationship as shown in FIG. 1, which is hereinafter referred to as the P-E hysteresis loop.

To be more specific, the ferroelectric material of the present invention exhibits an antiferroelectric phase at room temperature. When the intensity of an electric field applied to the ferroelectric material is increased and amounts to $E_{A-F}$, the structural phase of the ferroelectric material is changed from the antiferroelectric phase to a ferroelectric phase; and when the intensity of the electric field is further increased until the polarization is saturated, and then the intensity of the electric field is decreased to $E_{F-A}$, the structural phase of the ferroelectric material is changed from the ferroelectric phase to an antiferroelectric phase.

Figure 2:
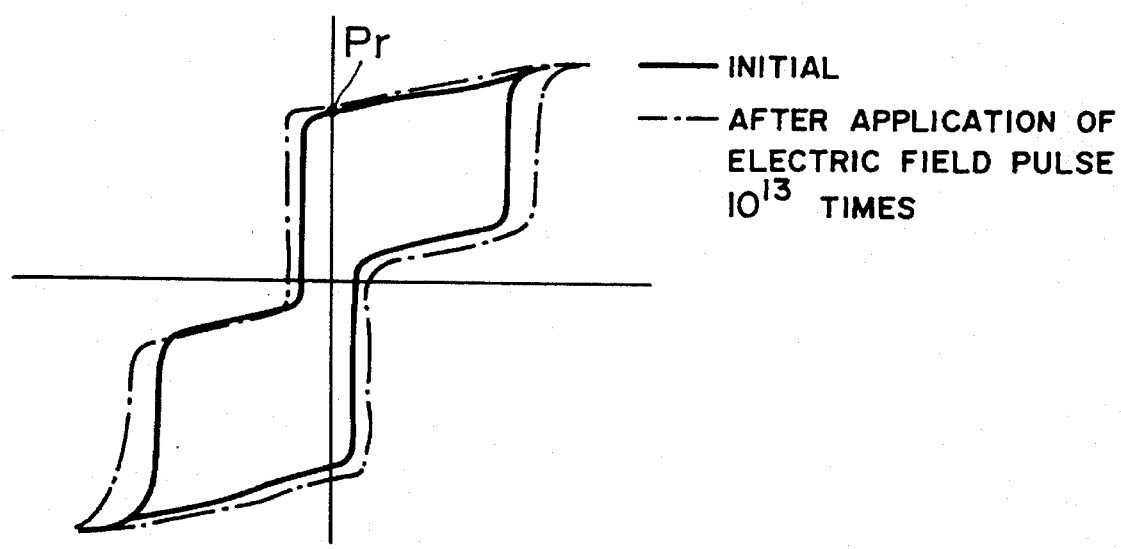
FIG. 2 shows a hysteresis loop with respect to a polarization-electric field relationship of a ferroelectric material of the present invention after the application of an electric field pulse $10^{13}$ times.

The phase transition electric field $E_{A-F}$ of the ferroelectric material of the present invention is shifted to a lower electric field as the temperature thereof is raised as shown in FIG. 2.

Furthermore, the phase transition electric field $E_{F-A}$ of the ferroelectric material of the present invention at which the structural phase of the ferroelectric material is changed from the ferroelectric phase to the antiferroelectric phase is on a negative side with respect to zero volt. In other words, the phase transition electric field $E_{F-A}$ of the ferroelectric material of the present invention is of a negative value.

Since the ferroelectric material of the present invention having the above-mentioned characteristics has a negative value with respect to the phase transition electric field $E_{F-A}$, even when the applied electric field is eliminated therefrom, a residual polarization Pr is generated in the ferroelectric material, so that the state of a ferroelectric phase is retained.

Furthermore, when a laser beam is applied to a thin film comprising the above-mentioned ferroelectric material while a D.C. bias electric field with an intensity slightly smaller than that of the phase-transitional electric field $E_{A-F}$ is applied, the structural phase transition from the antiferroelectric phase to the ferro-electric phase takes place, so that even when the application of the laser beam and the electric field is eliminated, recording bits corresponding to the laser spots applied thereto remain formed in the film.

Furthermore, it has been confirmed that the ferroelectric phase of the recording bits is changed to an antiferroelectric phase by the application of a laser beam with an intensity above a certain value, under the application of a bias electric field of zero volt. In other words, it has been confirmed that the recording bits can be erased by the application of the laser beam. Therefore, it is possible to perform rewritable recording in a recording layer comprising a film composed of the above ferroelectric material.

The ferroelectric material exhibits a Kerr effect or mere changes in the refractive index thereof in accordance with the polarized direction of the ferroelectric material when a linearly polarized laser beam is applied thereto. Therefore, bits information can be obtained by applying a weak laser beam with such an intensity that does not affect the state of the ferroelectric phase of the recording bits, using a similar system to that for magneto-optical recording.

It has also been confirmed that the ferroelectric material with the above-mentioned characteristics are not always required to be strictly composed of a single antiferroelectric phase at room temperature, but a ferroelectric phase may be mixed with the antiferroelectric phase in order to achieve the desired objects of the present invention. In this case, it is preferable that the antiferroelectric phase be contained in a ratio of 30% or more, more preferably 50% or more, in order to obtain an appropriate S/N ratio and good reproduction characteristics.

An example of a ferroelectric material for use in an optical recording medium is a lead-based composite oxide with the following formula (I):

$$Pb[(Zr_x Sn_x)y_1 Ti_y]O_3 \qquad (I)$$

where $x_1=1-x$, $y_1=1-y$, $0 \leq x \leq 0.5$, and $0 \leq y \leq 0.1$.

In order to improve the crystallinity of a thin film comprising the above lead-based composite oxide, an auxiliary agent for sintering such as lanthanum, bismuth, or niobium may be added to the composite oxide.

For example, a lead-based composite oxide containing niobium with the following formula (II) can be employed:

$$Pbz_1 Nbz[(Zr_x Sn_x)y_1 Ti_y]z_2 O_3 \qquad (II)$$

where $z_1=1-0.5z$, $x_1=1-x$, $y_1=1-y$, $z_2=1-z$, $0 \leq x \leq 0.5$, $0 \leq y \leq 0.1$, and $0 \leq z \leq 0.02$.

Representative examples of a ferroelectric material for use in a recording layer of an optical recording medium of the present invention include:

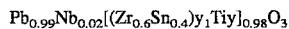

$$Pb_{0.99}Nb_{0.02}[(Zr_{0.6}Sn_{0.4})y_1 Ti_y]_{0.98}O_3$$

where $y_1=1-y$, $0.06 \leq y \leq 0.065$, and

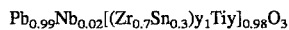

$$Pb_{0.99}Nb_{0.02}[(Zr_{0.7}Sn_{0.3})y_1 Ti_y]_{0.98}O_3$$

where $y_1=1-y$, $0.04 \leq y \leq 0.06$.

It is better to fabricate a thin film of any of the above-mentioned ferroelectric materials by the pyrolysis of metal organic compounds as in the sol-gel process and the MOCVD process, which are excellent in terms of the composition control performance than a vacuum physical film formation method such as sputtering, since a multi-components system is involved in the fabrication of this film.

In the sol-gel process, a metal organic compound such as a metal alkoxide is hydrolyzed in a solution system, and subjected to condensation polymerization to grow metal-oxygen-metal bonds to prepare a solution containing a condensation polymer. The thus prepared solution is referred to as the precursor solution. The precursor solution is applied to a substrate and then sintered to obtain an inorganic oxide film.

When the precursor solution is applied to a substrate by spin coating, it is preferable that the viscosity of the precursor solution be adjusted to several cP to several tens cP. A chelating agent may be added to the precursor solution.

The precursor solution applied is sintered and crystallized. The sintering temperature therefor depends upon the kind of materials employed, but is generally lower than the sintering temperature for conventional finely-divided metal oxide particles.

The above-mentioned fabrication method provides a composite oxide without any deviation from the desired composition and makes it possible to attain the growth of crystals oriented in accordance with the atomic arrangement of the substrate.

Alternatively, a film of the ferroelectric material can be fabricated without conducting the above-mentioned coating by spin coating and sintering process, but by conducting the following steps:

A coating liquid employed in the conventional sol-gel process is made a mist by ultrasonic spraying. The mist is transferred together with a carrier gas onto a substrate placed in a reaction chamber by heating the substrate, or by lamp annealing, or by repeating a pyrolysis step, to deposit the components of the coating liquid on the substrate, whereby a film of the ferroelectric material is fabricated.

Alternatively, metal organic oxides or organometal compounds with the formulation of ceramics to be made are separately introduced into a reaction chamber, together with a carrier gas, by use of bubblers, and are accumulated on a heated substrate by the MOCVD process, whereby a film of the ferroelectric material is fabricated.

An optical recording material according to the present invention comprises a substrate and a recording layer comprising the above-mentioned ferroelectric material provided on the substrate. As the material for the substrate, for example, glass can be employed. It is preferable that the thickness of the recording layer be in the range of 300 to 1000 nm. The recording layer can be formed on a substrate by a film formation method which will be described later.

The ferroelectric material which constitutes the above-mentioned recording layer is a crystalline oxide and therefore stable, so that it unnecessary to provide protective layer on both sides of the recording layer as in currently employed magneto-optical recording media.

The optical recording medium of the present invention may be provided with an upper electrode film and a lower electrode film on the upper side and the lower side thereof, respectively in order to apply a D.C. bias electric field thereto. In this case, it is preferable that at least the upper electrode film which is on a laser-beam-incident side be a transparent electrode film, for instance, composed of $In_2O_3$, or ITO. The lower electrode film may be composed of a conventional metal such as Pt, Ti, Ta, or Cr. The D.C. bias electric field may be applied by a conventional method.

The optical recording medium of the present invention comprises the recording layer comprising the ferroelectric material having the above-mentioned characteristics, so that the Kerr rotation angle thereof is several times that of a conventional magneto-optical recording medium. Furthermore, in the optical recording medium of the present invention, since the Kerr rotation is conducted in a reflection mode, the optical path length thereof is 2 times that of a conventional magneto-optical recording medium, and a reflection layer is not required, which is required for conventional magneto-optical recording media in order to increase the Kerr rotation angle. Therefore, the optical recording medium of the present invention can provide sufficiently high C/N ratio, and high signal quality which can handle wide band analog signals even though the layer structure of the recording medium is very simple. Further, the repetition of $10^9$ or more of polarization reversal is possible in this ferroelectric material, so that the durability thereof with respect to repeated recording and erasing is 3-digits or more times that of a conventional phase-change type optical recording medium. Since an external electric field is not required, the system structure of a recording and reproduction apparatus for the optical recording medium of the present invention can be significantly simplified.

Recording information, erasing recorded information and reproducing recorded information by use of the optical recording medium of the above-mentioned structure of the present invention will now be explained.

When information is recorded in the above optical recording medium of the present invention, a laser beam with a predetermined intensity Pw is applied to the recording layer of the optical recording medium while a D.C. bias electric field Eb for which intensity is lower than a phase transition electric field $E_{A-F}$ of the recording layer from an antiferroelectric phase to a ferroelectric phase by about 20 KV/cm to 10 KV/cm is applied to the recording layer of the optical recording medium. By the application of the laser beam and the electric field, the phase transition electric field $E_{A-F}$ is shifted to a lower electric field, and when $E_{A-F}$ becomes equal to the D.C. bias electric field Eb, that is, when $E_{A-F}$=Eb, the portions to which the laser beams have been applied make a phase change from an antiferroelectric phase to a ferroelectric phase. Thereafter, the application of the laser beam is stopped and the applied electric field is eliminated. Then the ferroelectric phase is stabilized and retained at room temperature, so that recording bits are formed.

When erasing recorded information, a laser beam with an intensity Pe which is about 1.5 times the intensity Pw of the laser beam applied when recording is applied to the recording layer of the recording medium without the application of any D.C. bias electric field, whereby recorded information is erased.

When reproducing recorded information, a laser beam with an intensity Px which is about 1/10 of the intensity Pw of the laser beam for recording, or about 1/10 of the intensity Pe of the laser beam for erasing recorded information is applied to the recording layer of the recording medium and the recorded information is read by utilizing the Kerr effect by a similar production system to that for a conventional magneto-optical recording medium. Alternatively, the changes in the optical density of the laser beam applied to the recording layer of the optical recording medium, corresponding to the changes in the refractive index of the recording layer of the optical recording medium, are detected by providing an aperture in front of a detector placed in the optical path for the laser beam, whereby recorded information is reproduced.

Figure 5:
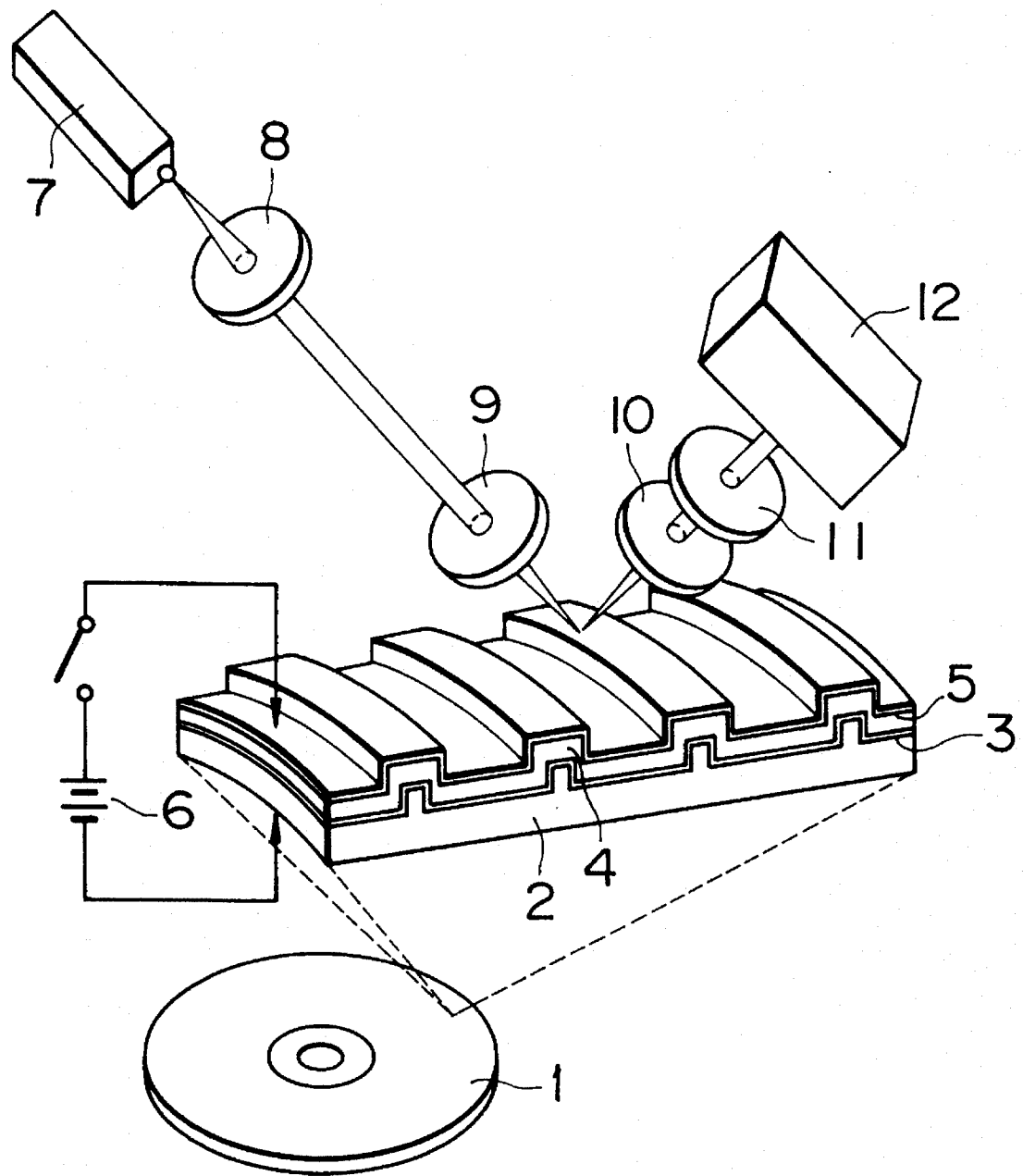
FIG. 5 is a schematic perspective view of a basic recording and reproduction system for use with an optical recording medium of the present invention.

FIG. 5 shows a schematic perspective view of a basic recording and reproduction system for use with the optical recording medium of the present invention. In FIG. 5, reference numeral 1 indicates an optical recording medium of the present invention; reference numeral 2, a substrate; reference numeral 3, a lower electrode; reference numeral 4, a recording layer; reference numeral 5, an upper electrode; reference numeral 6, a power source; reference numeral 7, a laser; reference numerals 8, 9, 10, lenses; reference numeral 11, an analyzer; and reference numeral 12, an optical detection device. At least one of the lower electrode 3 or the upper electrode 4 is optically transparent.

The ferroelectric material of the present invention which exhibits a structural antiferroelectric-to-ferroelectric phase transition as shown in FIG. 1 can retain the state of a ferroelectric phase even when the electric field applied thereto is eliminated. The features of this material are that in a conventional ferroelectric material, a polarization reversal current is detected when the recording bits are read, but in the ferroelectric material of the present invention, the current corresponding to the polarization reversal current is obtained as a structural phase transition current, and when FRAM using the ferroelectric material of the present invention can be designed in exactly the same manner as in the case of a conventional FRAM.

With respect to the problem of the fatigue, which is one of the most important matters of the ferroelectric material of the present invention, the phase transition deterioration of this material, which corresponds to the polarization reversal of the ferroelectric material, is indicated by a shift of the residual polarization value Pr at a zero electric field from the initial value thereof. As shown in FIG. 2, the residual polarization value Pr is substantially at the same position as that of the initial value or at an increased position. This indicates that there is substantially no fatigue in the ferroelectric material of the present invention. This is because the phase transition electric field $E_{F-A}$ from a ferroelectric phase to an antiferroelectric phase is shifted to a negative electric field side by the fatigue. Although the evaluation of the fatigue characteristics of the ferroelectric material of the present invention was performed only $10^{13}$ times, it is well expected that the same characteristics will be maintained even when the phase transition is repeated over $10^{14}$ times, because the ferroelectric material of the present invention exhibits a particular tendency with respect to the deterioration thereof which is contrarily different from conventional ferroelectric materials.

Examples of a material having the same characteristics as those of the above-mentioned ferroelectric material of the present invention include lead-based composite oxides serving as piezoelectric materials which include at least one component selected from the group consisting of zirconium oxide lead, hafnium oxide lead, and tin oxide lead, which become antiferroelectric materials at room temperature.

It is not always necessary that materials having such characteristics strictly consist of an antiferroelectric phase at room temperature, but a ferroelectric phase may be mixed with the antiferroelectric phase.

Specific examples of the above-mentioned materials include zirconium oxide titanium oxide lead derived ceramics with the formula $Pb(Zr, Sn, Ti)O_3$, and the previously mentioned lead-based composite oxides of formulae (I) and (II). It is preferable that these lead-based composite oxides be prepared by the pyrolysis of metal organic compounds by the sol-gel process and MOCVD process as mentioned previously.

The zirconium oxide tin oxide lead based ceramics used as ferroelectric material of the present invention can assume a pseudo-tetragonal perovskite structure by selecting an appropriate composition thereof, and exhibit excellent antiferroelectric properties.

The inventors of the present invention have discovered that when the zirconium oxide tin oxide lead based ceramics are formed into a thin film, the ceramics do not assume the pseudo-tetragonal perovskite structure, but assume a cubic system; and when the zirconium oxide tin oxide lead based ceramics are formed into a thick film, the ceramics assume a pseudo-tetragonal system. Furthermore, the inventors of the present invention have discovered that a film of the zirconium oxide tin oxide lead based ceramics has a critical film thickness of 1 µm at which the film can assume a pseudo-tetragonal system. When the film assumes a cubic system, it does not exhibit excellent antiferroelectric-to-ferroelectric phase transition properties, so that the cubic-system film cannot be used as a micro-displacement control device or a shape memory device. However, when the thickness of the film is increased, preferably to 1 µm or more, the changes in the volume caused by the electric-field-induced distortion of the film can be applied to a micro-displacement control device and a shape memory device.

A thick film of the zirconium oxide tin oxide lead based ceramics is fabricated by the sol-gel process. In the sol-gel process, a large volume shrinkage takes place in a coated layer for the ceramics film because of the decomposition of an organic material at the sintering thereof. Therefore when a thick film of the ceramics is formed, cracks are apt to be formed by the stress generated during the sintering process. Therefore one of the problems to be solved with respect to the sol-gel process is how to increase the thickness of a crack-free thick film of the ceramics.

Examples of a starting material to be employed in the sol-gel process include metal organic compounds such as metal acylate compounds, for example, metal alkoxides and acetates; and inorganic salts such as nitrate, oxalate, and perchlorate, corresponding to the compositions of composite oxides to be obtained.

Generally metal oxides are hydrolyzed in the presence of water and then a condensation polymerization reaction proceeds. The preservability and stability of metal oxides are so poor that it is extremely difficult to condense a coating solution of metal oxides without a chelating agent. A maximum thickness of a crack-free metal oxide layer formed by one coating is about 500 Å, so that it is complicated and difficult to fabricate a thick crack-free metal oxide layer by repeating the above-mentioned coating a number of tines.

According to the present invention, a thick metal oxide film can be prepared without difficulty by using a coating liquid containing a metal acylate and a carboxylic acid. To be more specific, a coating liquid containing a metal acylate and a carboxylic acid is extremely stable, and does not gel even when water is added thereto and when the coating liquid is highly concentrated. The thickness of a crack-free metal oxide film that can be obtained by one sintering in the above-mentioned method is about not less than 5 times the thickness of a film obtained by a method comprising the steps of the hydrolysis of a metal alkoxide and a condensation reaction. In this sense, the film formation efficiency of this method is 5 times or more in comparison with the efficiency of the conventional method.

In the metal acetate to be employed in the above-mentioned sol-gel process, it is not always necessary that all the organic moieties bonded to metals be acylated. For instance, in the case of acetyl group, two molecules of a metal acetate substituted with acetyl groups in its entirety are condensed to form an insoluble solid when the metal is Ti or Zr. Thus, it is required that all the metal atoms which form metal oxides be partially or entirely acylated and the metal acetate be completely soluble in a solvent. A metal acetate which is soluble in a solvent can be prepared by dissolving a metal alkoxide in acetic acid in an amount of the moles required for producing a metal acetate, when necessary, with the application of heat to the mixture.

Examples of a carboxylic acid employed for acylation include oxalic acid, acetic acid, propionic acid, butyric acid, stearic acid, and valeric acid.

The crystallization of a layered material obtained by the above-mentioned sol-gel process can be promoted by annealing. The annealing temperature is different depending upon the kind of material, but generally is lower than the sintering temperature for metal oxide particles in general use. In this sense, the sol-gel process has various uses since the composition and structure of some devices are apt to be changed when heated to high temperatures.

An example of a zirconium oxide tin oxide lead based ceramics with a large change in the volume caused by an antiferroelectric-to-ferroelectric phase transition at room temperature is the zirconium oxide tin oxide lead based ceramics of the formula (II) mentioned previously.

The fine working limit on the high integration of a micro-displacement control device or a shape memory device largely depends upon the thickness of the ceramics film. In other words, the larger the thickness of the ceramics film, the more difficult the fine working. On the other hand, there are many cases where it is required that the ceramics film be thick in view of the design of a device to be made, the displacement required for the device, the voltage applied thereto, and the voltage durability thereof.

In the case where a film with a thickness in the range of 1 µm to several tens µm is formed on a substrate, micro-working up to the precision of not more than several tens µm is possible, so that a highly integrated micro-displacement control device and a highly integrated shape memory device can be actually fabricated.

According to the present invention, a high density micro-displacement control device is fabricated by using a thick ceramics film prepared by the above-mentioned sol-gel process.

A volume change ratio obtained by an electric-field-induced distortion of an antiferroelectric-to-ferroelectric phase transition material is large.

It is supposed that the length of a device in the initial stage is l, and the length changed by the application of an electric field thereto is Δl. For instance, in the case of a piezoelectric material such as PZT, the following changes are caused by the reverse piezoelectric effect thereof: $\Delta l/l = 0.09\%$ in the direction parallel to the direction of the electric field, and $\Delta l/l=-0.03\%$ in the direction perpendicular to the direction of the electric field. In contrast, in the case of a ferroelectric-to-antiferroelectric phase transition of PNZST, the following changes are obtained as shown in FIG. 6: $\Delta l/l=0.3\%$ in the direction parallel to the direction of the electric field, and $\Delta l/l=0.07\%$ in the direction perpendicular to the direction of the electric field.

Figure 6A:
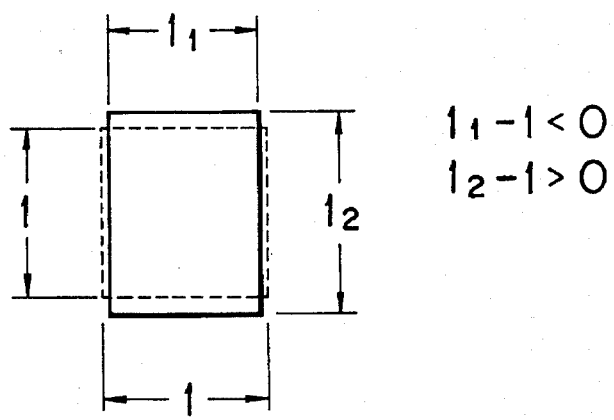
FIG. 6(a) is a diagram showing an electric-field-induced distortion of a conventional piezoelectric material.
Figure 6B:
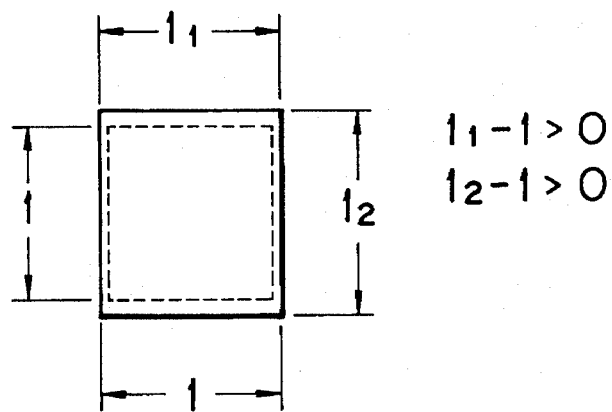
FIG. 6(b) is a diagram showing an electric-field-induced distortion of an antiferroelectric-to-ferroelectric phase transition material of the present invention.
Figure 6C:
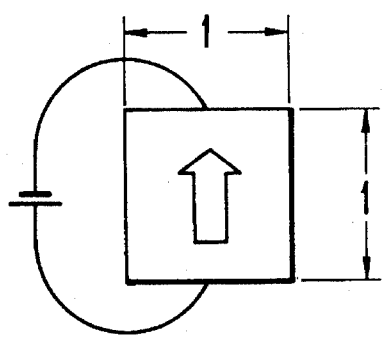
FIG. 6(c) shows the conventional piezoelectric material or the antiferroelectric-to-ferroelectric phase transition material of the present invention prior to the application of an electric field.

This comparison is illustrated in FIGS. 8(a), 8(b) and 8(c). FIG. 6(a) is a diagram showing an electric-field-induced distortion of a conventional piezoelectric material. FIG. 6(b) is a diagram showing an electric-field-induced distortion of an antiferroelectric-to-ferroelectric phase transition material of the present invention. FIG. 6(c) shows the conventional piezoelectric material or the antiferroelectric-to-ferroelectric phase transition material of the present invention prior to the application of an electric field. In FIGS. 6(a) to 6(c), $l_1$ indicates the length of the antielectric-to-ferroelectric phase transition material in the direction perpendicular to the electric field after the application of the electric field, $l_2$ indicates the length of the antiferroelectric-to-ferroelectric phase transition material in the direction parallel to the electric field after the application of the electric field, and $l$ indicates the original length of the antiferroelectric-to-ferroelectric phase transition material before the application of the electric field.

Thus, in comparison with the actuator employing the conventional piezoelectric material, the distortion generated per unit thickness of the film is much larger in the antiferroelectric-to-ferroelectric phase transition material of the present invention, so that the film thickness which provides the same displacement is thinner in the antiferroelectric-to-ferroelectric phase transition material of the present invention. As a matter of course, the fine working and the improvement of the accuracy of the fine working are easier in the antiferroelectric-to-ferroelectric phase transition material of the present invention.

For example, the above-mentioned thick ceramics film produces a large displacement induced by the electric-field-induced antiferroelectric-to-ferroelectric phase transition, and can increase the speed of the electric-field-induced antiferroelectric-to-ferroelectric phase transition, and therefore can be used in an ink jet device for which a high response speed is required.

The features of this invention will become apparent in the course of the following description of exemplary embodiments, which are given for illustration of the invention and are not intended to be limiting thereof.

EXAMPLE 1-1

An FRAM is generally constructed by successively overlaying on a substrate a MOS transistor, a lower electrode, a piezoelectric material film, and an upper electrode.

However, in this example, for the purpose of evaluating a piezoelectric material film, a device was fabricated as follows:

A $SiO_2$ field oxide film with a thickness of 1 μm serving as an insulating and diffusion-preventing layer was formed on a Si wafer substrate. A Ti layer with a thickness of 30 nm, and a Pt layer with a thickness of 50 nm were successively formed on the $SiO_2$ field oxide film by vacuum deposition.

A ferroelectric material film layer comprising a zirconium oxide tin oxide lead based ceramics with the composition of the following formula, serving as a piezoelectric material, having a thickness of 1 μm, was formed:

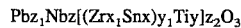

where $z_1=1-0.5z$, $x_1=1-x$, $y_1=1-y$, $z_2=1-z$, and $z=0.02$, $z=0.4$, and $y=0.063-0.065$.

This ferroelectric material film layer was formed by the sol-gel process. The temperature for the crystallization of the ferroelectric material film layer prepared by the sol-gel process was in the range of 600° to 650° C.

A Pt layer with a thickness of 50 nm, a Ti layer with a thickness of 30 nm, and an Al layer with a thickness of 500 nm were successively formed on the ferroelectric material film layer, whereby an upper electrode was formed on the ferroelectric material film layer.

This ferroelectric material film layer was evaluated by applying an alternating electric field with a pulse period of 1 μsec, and measuring the decrease of Pr with respect to the initial value of Pr. The result was that the decrease of Pr with respect to the initial value of Pr was only 7% after repeating the application of the electric field $10^{15}$ times.

EXAMPLE 1-2

The procedure for fabricating the ferroelectric film layer in Example 1-1 was repeated except that the zirconium oxide tin oxide lead based ceramics employed in Example 1-1 was replaced by a zirconium oxide tin oxide lead based ceramics with the composition of the following formula, having a thickness of 300 nm, was formed:

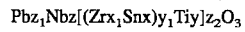

where $z_1=1-0.5z$, $x_1=1-x$, $y_1-1-y$, $z_2=1-z$, and $z=0.02$, $x=0.3$, and $y=0.055$.

This ferroelectric material film layer was of a ferroelectric phase and antiferroelectric phase mixed type.

Figure 3:
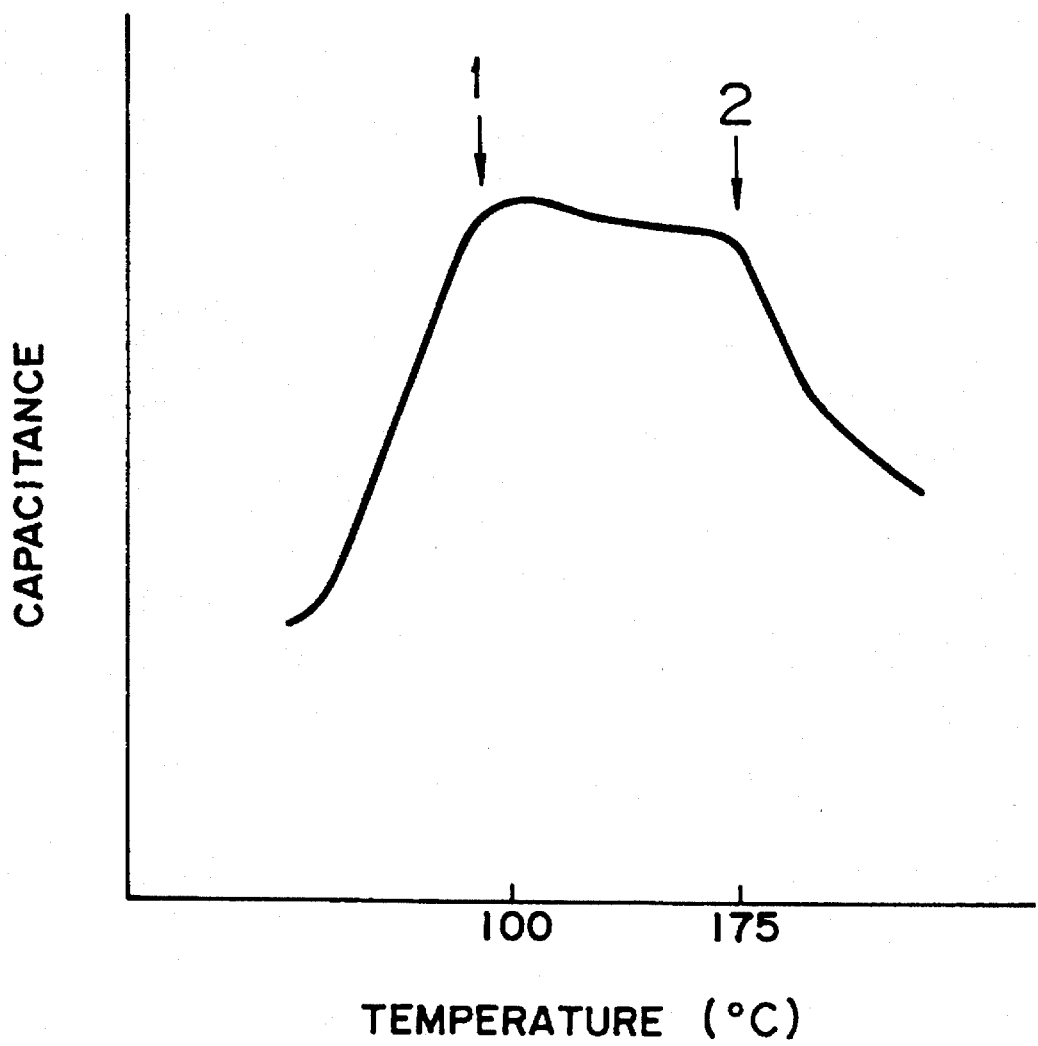
FIG. 3 shows the capacitance-temperature characteristics of a ferroelectric material film of a ferroelectric phase and antiferroelectric phase mixed type in Examples 1–2 and Example 3.
Figure 4:
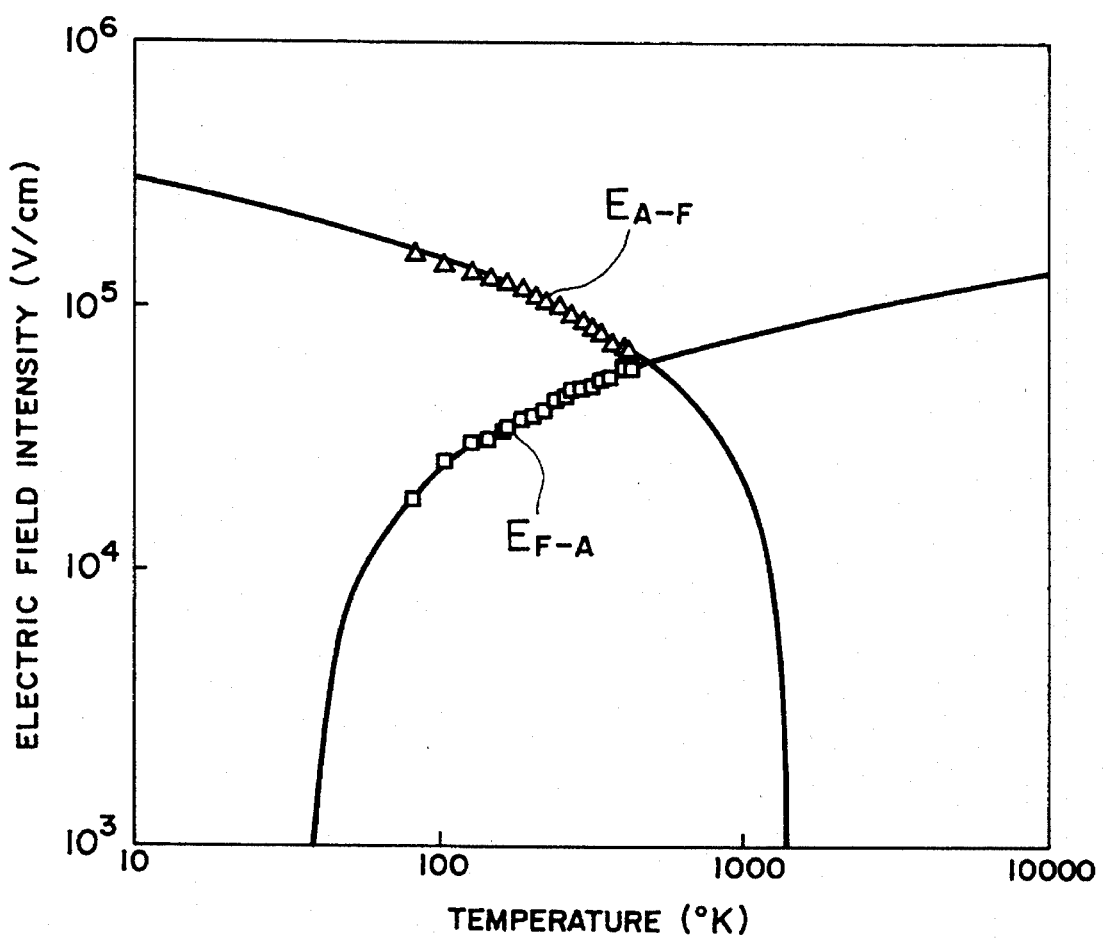
FIG. 4 is a diagram showing the temperature dependance of the phase transition electric fields of a ferro-electric material of the present invention.

This ferroelectric material film layer has two maximum peaks 1 and 2 of the capacitance thereof with respect to the temperature thereof as shown in FIG. 3. The first maximum peak 1 on the lower temperature side is caused by a structural phase transition from a ferroelectric phase to a paraelectric phase, and the second maximum peak 2 on the higher temperature side is caused by a structural phase transition from an antiferroelectric phase to the paraelectric phase.

The thus fabricated ferroelectric material film layer was evaluated in the same manner as in Example 1-1. The result was that the decrease of Pr with respect to the initial value of Pr was in the range of 7 to 8% after repeating the application of the electric field $10^{15}$ times, although the value of Pr was slightly varied as the number of the application of the electric field was increased.

EXAMPLE 2

A Ti layer with a thickness of 30 nm, and a Pt layer with a thickness of 50 nm were successively overlaid on a glass substrate by sputtering, whereby a lower electrode was formed on the glass substrate.

A ferroelectric material film layer of $Pb_{0.99}Nb_{0.02}[(Zr_{0.6}Sn_{0.4})_{0.937}Ti_{0.063}]_{0.98}O_3$ with a thickness of 1 μm, serving as a recording layer, was formed on the lower electrode by the sol-gel process. The temperature for the crystallization of the ferroelectric material film layer prepared by the sol-gel process was 570° C.

An ITO film layer with a thickness of 10 nm was formed as an upper electrode on the ferroelectric material film layer, whereby an optical recording medium of the present invention as fabricated.

The phase transition voltage $E_{A-F}$ of the recording layer of this optical recording medium was 8 V.

Therefore, information was written in this optical recording medium by setting the bias electric field Eb for recording at 7 V, with the application of a laser beam with a power of 10 mW by use of a semiconductor laser beam with a wavelength of 780 nm.

The written information was read out from the optical recording medium by applying a laser beam with a power of 1.5 mW thereto and utilizing the Kerr effect from the light reflected from the optical recording medium. The Kerr rotation angle by the ferroelectric phase in the recording layer was about 1.1 degrees, which was about 3 times the rotation angle obtained by a magnetic layer of a conventional magneto-optical recording medium.

Further, it was confirmed that the recorded bit information was erased by the application of a laser beam with a power of 15 mW without the application of a bias electric field (i.e., under a zero bias electric field).

Overwriting was successfully conducted by the on-off application of a bias electric field Eb with a laser beam with a power of 15 mW being continuously applied thereto.

Furthermore, in order to evaluate the durability with respect to the repeated recording and erasure of the above optical recording medium of the present invention, an alternating electric field with a voltage of 16 V and a pulse period of 1 μsec was applied to the optical recording medium, and the decrease of the value Pr of the residual polarization from the initial value thereof was measured. The result was that there was no decrease in the value Pr of the residual polarization after the alternating electric field was applied $10^{11}$ times. This indicates that the optical recording medium of the present invention has a superior durability with respect to the repeated recording and erasure to those of recording layers of conventional phase-changing type recording media and magnetic layers of conventional magneto-optical media.

EXAMPLE 3

The procedure for fabricating the optical recording medium in Example 2 was repeated except that the recording layer in the optical recording medium was replaced by a ferroelectric material film layer of $Pb_{0.99}Nb_{0.02}[(Zr_{0.7}Sn_{0.3})_{0.945}Ti_{0.055}]_{0.98}O_3$ with a thickness of 300 nm, whereby an optical recording medium of the present invention was prepared.

The ferroelectric material which constituted the recording layer of this optical recording medium has two maximum peaks 1 and 2 of the capacitance thereof with respect to the temperature thereof as shown in FIG. 3. The first maximum peak 1 on the lower temperature side is caused by a structural phase transition from a ferroelectric phase to a paraelectric phase, and the second maximum peak 2 on the higher temperature side is caused by a structural phase transition from an antiferroelectric to the paraelectric phase.

The thus fabricated ferroelectric material film layer was evaluated in the same manner as in Example 2. The result was that the Kerr rotation angle was 0.9 degrees, which was slightly smaller than the Kerr rotation angle of the optical recording medium prepared in Example 2, but the other properties were substantially the same as those of the optical recording medium in Example 2.

EXAMPLE 4

A coating liquid was prepared by using a sol-gel process as follows:

0.05 moles of lead acetate $Pb(CH_3COO)_2 \cdot 3H_2O$ was dissolved in acetic acid and the solution was heated to 110° C. for dehydration, and was then cooled to 80° C. To this solution was added a solution of 0.001 moles of niobium pentaethoxide $Nb(OC_2H_4)_5$, 0.033 moles of zirconium tetrapropoxide $Zr(OC_2H_4CH_3)$, 0.014 moles of tin tetraisoproxide $Sn(OCH(CH_3)_2)_4$, and 0.002 moles of titanium isoproxide $Ti(OCH(CH_3)_2)_4$ which were dissolved in 0.11 moles of acetic acid. The mixture was allowed to react at 80° C. for 10 minutes.

To this reaction mixture, ethylene glycol and water were added to adjust the viscosity thereof, whereby a coating liquid was prepared.

Ti and Pt were successively deposited in vacuum on a Si substrate with a $SiO_2$ film layer thereon.

The previously mentioned coating liquid was then coated on the above fabricated platinum-coated silicon substrate by spin coating. The coated liquid was dried at 120° C., and then sintered at 700° C. for 3 hours, whereby a (Pb, Nb) (Zr, Sn, Ti)$O_3$ film, which is hereinafter referred to as the PNZST film, was fabricated.

The thickness of a crack-free PNZST film obtained by the above-mentioned method depended upon the viscosity of the coating liquid employed. A film thickness of 1 μm or more was obtained by repeating the coating 8 times.

Figure 7:
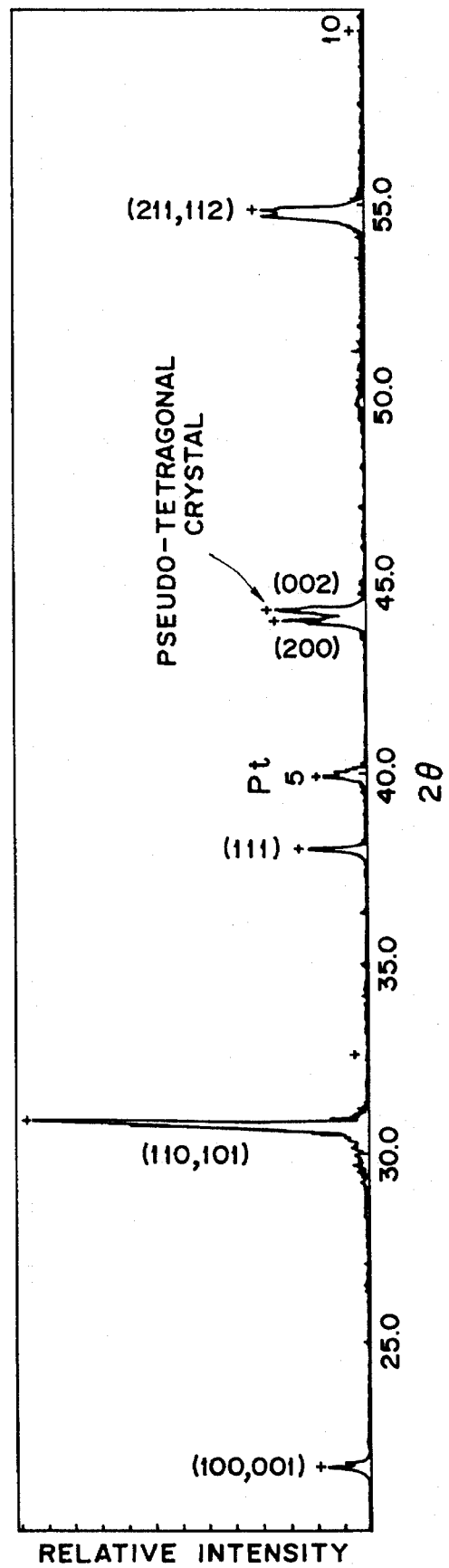
FIG. 7 shows an X-ray diffraction pattern of a PNZST film with a thickness of 1 μm.

FIG. 7 shows an X-ray diffraction pattern of a 1 μm thick PNZST film. The X-ray diffraction was conducted by using MXP$^3$ (made by MAC SCIENCE Company, Ltd.) provided with a Cu target (fused tube), a diverging slit (0.5 deg), a scattering slit (0.5 deg), and a light receiving slit (0.15 mm), with the scanning speed set at 40 deg/min. The result was that the fabricated PNZST film had a pseudo-tetragonal perovskite crystal structure with a grating constant of 4.12 Å (axis a), and 4.09 Å (axis C).

Platinum was deposited on the thus fabricated PNZST film which was provided on the platinum-coated silicon substrate, whereby an upper electrode was provided on the PNZST film. The changes in the quantity of charges in the PNZST film relative to an electric field applied thereto were measured. The result was that the PNZST film exhibited a hysteresis induced by antiferroelectric-to-ferroelectric phase transition.

EXAMPLE 5

The same coating liquid prepared in Example 4 was coated on a Pt/Ti/SiO$_2$/Si substrate and a PNZST film with a thickness of 5 μm was formed.

It was possible to perform L & S working with 5 μm on the PNZST film by a wet etching method using photolithography and a mixed acid.

Figure 9:
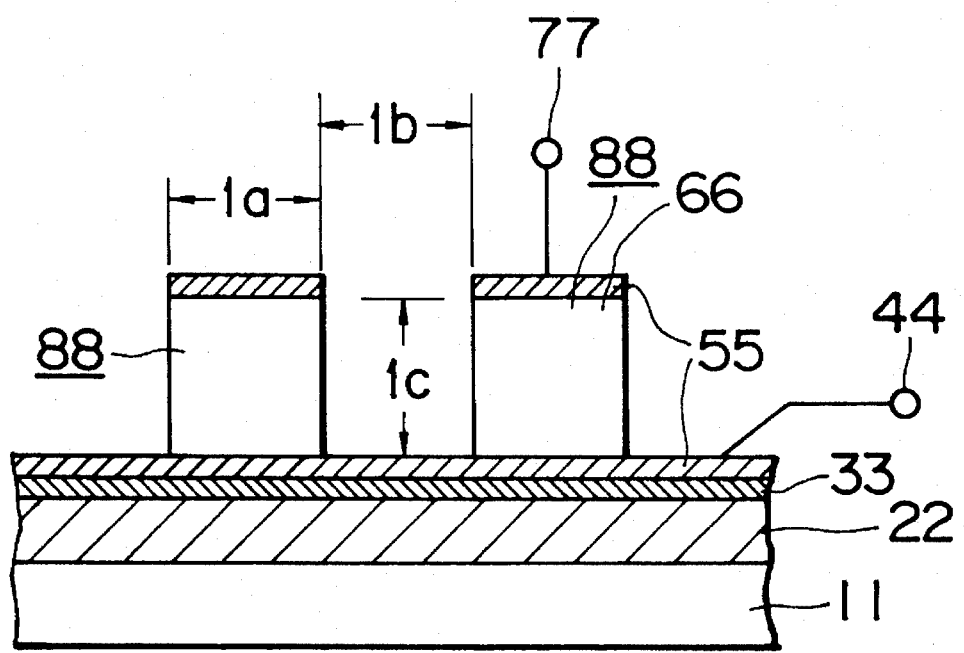
FIG. 9 shows a schematic cross-sectional view of an integrated actuator comprising a PNZST film fabricated in Example 5.

Platinum electrodes were provided on a patterned PNZST film, whereby an integrated actuator was fabricated as illustrated in FIG. 9.

In FIG. 9, reference numeral 11 indicates a Si substrate; reference numeral 22, a SiO$_2$ film layer; reference numeral 33, a Ti film layer; reference numeral 44, an under common electrode; reference numeral 55, a Pt film layer; reference numeral 66, a PNZST film layer; reference numeral 77, an upper individual electrode; and reference numeral 88, a micro-displacement control unit. Further, each of 1a, 1b and 1c indicates a length of 5 μm.

Each of the thus fabricated micro-displacement control units 88 can be independently actuated. Each of the micro-displacement control units 88 made a displacement of 0.012 μm in the direction parallel to an electric field with the application of 40 V thereto.

COMPARATIVE EXAMPLE 1

Figure 8:
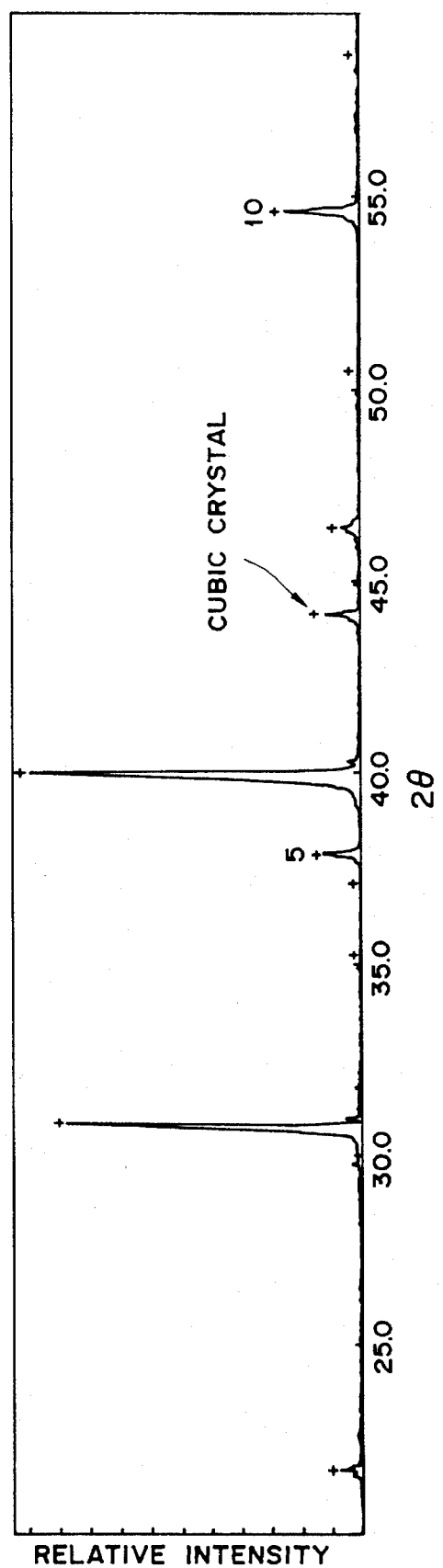
FIG. 8 shows an X-ray diffraction of a comparative PNZST film with a thickness of 0.8 μm.

A PNZST film was fabricated in the same manner as in Example 4 except that the thickness of the PNZST film was changed to 0.8 μm. FIG. 8 shows an X-ray diffraction of the PNZST film. The PNZST film had a cubic crystal structure with a grating constant of 4.10 Å and did not exhibit antiferroelectric properties.

Thus, according to the present invention, a highly reliable FRAM can be obtained by use of a piezoelectric material which is not caused to deteriorate by repeating memory rewriting. Further, according to the present invention, an optical recording medium can be provided, which does not require an external magnetic field, is capable of performing overwriting by a simple layer structure, has excellent reproduction performance and high durability with respect to repeated recording and reproduction. Furthermore, according to the present invention, a highly integrated micro-displacement control device and a shape memory device are provided.

What is claimed is:

1. A ferroelectric material which has hysteresis characteristics in the polarization-electric field relationship thereof, exhibits a mixed state of an antiferroelectric phase and a ferroelectric phase at room temperature, and carries out a structural phase transition from said mixed state to a ferroelectric phase with the application of an electric field thereto, with a phase transition electric field with which an antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

2. A ferroelectric material which comprises a lead-based composite oxide having hysteresis characteristics in the polarization-electric field relationship thereof, exhibiting an antiferroelectric phase at room temperature, and capable of carrying out a structural phase transition from said antiferroelectric phase to a ferroelectric phase with the application of an electric field thereto, with a phase transition electric field with which the antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

3. A ferroelectric material which comprises a lead-based composite oxide having hysteresis characteristics in the polarization-electric field relationship thereof, exhibiting a mixed state of an antiferroelectric phase and a ferroelectric phase at room temperature, and capable of carrying out a structural phase transition from said mixed state to a ferroelectric phase with the application of an electric field thereto, with a phase transition electric field with which an antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

4. The ferroelectric material as claimed in claim 2, wherein said lead-based composite oxide comprises at least one component selected from the group consisting of zirconium oxide lead, hafnium oxide lead, and tin oxide lead.

5. The ferroelectric material as claimed in claim 3, wherein said lead-based composite oxide comprises at least one component selected from the group consisting of zirconium oxide lead, hafnium oxide lead, and tin oxide lead.

6. A ferroelectric material which comprises a composite oxide prepared from a metal organic compound by a sol-gel process, having hysteresis characteristics in the polarization-electric field relationship thereof, exhibiting an antiferroelectric phase at room temperature, and capable of carrying out a structural phase transition from said antiferroelectric phase to a ferroelectric phase with the application of an electric field thereto, with a phase transition electric field with which the antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

7. A ferroelectric material which comprises a composite oxide prepared from a metal organic compound by pyrolysis thereof, having hysteresis characteristics in the polarization-electric field relationship thereof, exhibiting an antiferroelectric phase at room temperature, and capable of carrying out a structural phase transition from said antiferroelectric phase to a ferroelectric phase with the application of an electric field thereto, with a phase transition electric field with which the antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

8. A ferroelectric material which comprises a composite oxide prepared from a metal organic compound by a sol-gel process, having hysteresis characteristics in the polarization-electric field relationship thereof, exhibiting a mixed state of an antiferroelectric phase and a ferroelectric phase at room temperature, and capable of carrying out a structural phase transition from said mixed state to a ferroelectric phase with the application of an electric field thereto, with a phase transition electric field with which an antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

9. A ferroelectric material which comprises a composite oxide prepared from a metal organic compound by pyrolysis thereof, having hysteresis characteristics in the polarization-electric field relationship thereof, exhibiting a mixed state of an antiferroelectric phase and a ferroelectric phase at room temperature, and capable of carrying out a structural phase transition from said mixed state to a ferroelectric phase with the application of an electric field thereto, with a phase transition electric field with which an antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

10. A non-volatile semiconductor memory capable of obtaining bit information by detecting the polarizing direction of a piezoelectric material, said piezoelectric material being a ferroelectric material which has hysteresis characteristics in the polarization-electric field relationship thereof, exhibits a mixed state of an antiferroelectric phase and a ferroelectric phase at room temperature, and carries out a structural phase transition from said mixed state to a ferroelectric phase with the application of an electric field thereto, with a phase transition electric field with which an antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

11. An optical recording medium comprising a recording layer which comprises a ferroelectric material which has hysteresis characteristics in the polarization-electric field relationship thereof, exhibits a mixed state of an antiferroelectric phase and a ferroelectric phase at room temperature, and carries out a structural phase transition from said mixed state to a ferroelectric phase with the application of an electric field thereto, with a phase transition electric field with which an antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

12. A method of recording information in an optical recording medium comprising a recording layer which comprises a ferroelectric material which has hysteresis characteristics in the polarization-electric field relationship thereof, exhibits a mixed state of an antiferroelectric phase and a ferroelectric phase at room temperature, and carries out a structural phase transition from said mixed state to a ferroelectric phase with the application of an electric field thereto, with a phase transition electric field with which an antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value, comprising the step of applying a laser beam to said recording layer with a predetermined bias electric field being applied thereto to perform said structural phase transition in a portion of said recording layer to which said laser beam is applied, thereby recording information therein in the form of recording bits.

13. A method of recording information and erasing recorded information in an optical recording medium comprising a recording layer which comprises a ferroelectric material which has hysteresis characteristics in the polarization-electric field relationship thereof, exhibits an antiferroelectric phase at room temperature, and carries out a structural phase transition from said antiferro-electric phase to a ferroelectric phase with the application of an electric field thereto, with a phase transition electric field with which the antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value, comprising the steps of (1) applying a laser beam to said recording layer with a predetermined bias electric field being applied thereto to perform said structural phase transition in a portion of said recording layer to which said laser beam is applied, thereby recording information therein in the form of recording bits, and (2) erasing said recording bits with the application of a laser beam with a predetermined intensity under a zero bias electric field to perform a structural phase transition from said ferroelectric phase to said antiferroelectric phase.

14. A method of recording information and erasing recorded information in an optical recording medium comprising a recording layer which comprises a ferroelectric material which has hysteresis characteristics in the polarization-electric field relationship thereof, exhibits a mixed state of an antiferroelectric phase and a ferroelectric phase at room temperature, and carries out a structural phase transition from said mixed state to a ferroelectric phase with the application of an electric field thereto, with a phase transition electric field with which an antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value, comprising the steps of (1) applying a laser beam to said recording layer with a predetermined bias electric field being applied thereto to perform said structural phase transition in a portion of said recording layer to which said laser beam is applied, thereby recording information therein in the form of recording bits, and (2) erasing said recording bits with the application of a laser beam with a predetermined intensity under a zero bias electric field to perform a structural phase transition from said ferroelectric phase to said antiferroelectric phase.

15. A micro-displacement control device comprising a ferroelectric material which has hysteresis characteristics in the polarization-electric field relationship thereof, exhibits a mixed state of an antiferroelectric phase and a ferroelectric phase at room temperature, and carries out a structure phase transition from said mixed state to a ferroelectric phase with the application of an electric field thereof, with a phase transition electric field with which an antiferroelectric-to-ferroelectric phase transition is carried out being shifted to a lower electric field with the elevation of the temperature thereof, and a phase transition electric field with which a ferroelectric-to-antiferroelectric phase transition is carried out having a negative value.

16. The micro-displacement control device as claimed in claim 15, wherein said ferroelectric material comprises a zirconium oxide tin oxide lead based composite oxide having a pseudo-tetragonal perovskite crystal structure.

* * * * *